United States Patent [19]

Zoccolillo

[11] Patent Number: 5,287,199

[45] Date of Patent: Feb. 15, 1994

[54] FACSIMILE MESSAGE PROCESSING AND ROUTING SYSTEM

[75] Inventor: Susan M. Zoccolillo, Howell, N.J.

[73] Assignee: AT&T Bell Laboratories, Murray Hill, N.J.

[21] Appl. No.: 842,840

[22] Filed: Feb. 27, 1992

[51] Int. Cl.$^5$ .............................................. H04N 1/00
[52] U.S. Cl. ..................................... 358/402; 358/400;
358/407; 358/404; 358/444; 358/468; 358/440;
379/100
[58] Field of Search ............... 358/402, 400, 403, 407,
358/468, 440; 379/100, 90, 93

[56] References Cited

U.S. PATENT DOCUMENTS

| | | | |
|---|---|---|---|
| 4,566,127 | 1/1986 | Sekiya et al. | 382/56 |
| 4,677,552 | 6/1987 | Sibley, Jr. | 379/93 |
| 4,941,170 | 7/1990 | Herbst | 358/402 |
| 4,994,926 | 2/1991 | Gorden et al. | 358/400 |
| 5,001,766 | 3/1991 | Baird | 382/46 |
| 5,008,926 | 4/1991 | Misholi | 358/403 |
| 5,020,123 | 5/1991 | Thompson | 382/61 |
| 5,065,254 | 11/1991 | Hishida | 358/400 |
| 5,068,888 | 11/1991 | Sherk et al. | 358/402 |
| 5,084,769 | 1/1992 | Miura | 358/403 |
| 5,091,931 | 2/1992 | Milewski | 379/100 |
| 5,099,340 | 3/1992 | Kamada et al. | 358/402 |
| 5,157,514 | 10/1992 | Yoshioka | 358/403 |
| 5,175,684 | 12/1992 | Chong | 379/90 |

OTHER PUBLICATIONS

"The 5ESS Switching System" AT&T Technical Journal, vol. 64, No. 6, part 2, pp. 1305-1564, Jul./Aug. 1985. (Cover sheet and Index only are attached due to voluminous nature of publication-complete text will be furnished if requested.

J. F. Day et al., "Looking Over AT&T's Definity 75/85 Communications System" AT&T Technology, vol. 4, No. 2, pp. 50-59, Sep. 1989.

J. S. Licwinko et al., "AT&T Fax Products and Services Speed the Written Message" AT&T Technology, vol. 4, No. 2, pp. 12-17, Sep. 1989.

"No. 4 ESS" Bell System Technical Journal (BSTJ) vol. 56, No. 7, pp. 1015-1320, Sep. 1977. (Cover sheet and Index only are attached due to voluminous nature of publication-complete text will be furnished if requested).

H. S. Baird et al., "Image Segmentation by Shape-Directed Covers" IEEE Proceedings of the Tenth International Conference on Pattern Recognition, pp. 8-825, Jun. 1990.

L. J. Gawron et al., "Scanned-Image Technologies Bring New Ways to Conduct Business" AT&T Technology, vol. 6, No. 4, pp. 2-9, 1991.

H. P. Graf et al., "A CMOS Associative Memory Chip" IEEE Proceedings of the First International Conference on Neural Networks, vol. III, pp. 461-468, 1987.

D. Sheinbein et al., "800 Service Using SPC Network Capability" The Bell System Technical Journal, vol. 61, No. 7, Part 3, pp. 1737-1744, Sep. 1982.

Primary Examiner—Edward L. Coles, Sr.
Assistant Examiner—Fan Lee
Attorney, Agent, or Firm—Barry H. Freedman

[57] ABSTRACT

In this invention, a processor connected to a communication switching system i) intercepts or receives each facsimile message destined for a receiving party, ii) analyzes at least a portion of each message to collect, in addition to the called number, other routing information from the transmitted message, iii) converts the message to a different format, if necessary and iv) delivers that message to at least one of a plurality of other destination facsimile terminals based on a) the routing information gathered from the message and b) pre-arranged routing information stored in the processor and provided by the receiving party.

25 Claims, 6 Drawing Sheets

FIG. 3

| INFORMATION PROCESSING RECORD ||||
|---|---|---|---|
| DIALED NUMBER OR TRANSLATED EQUIVALENT | SEARCH RECORD || DESTINATION/ FUNCTION NUMBER |
| | SEARCH KEY TEXT/GRAPHICS | POSITION DATA | |
| 800-222-8888 | CHARACTER STRINGS 1 ⋮ | PAGE DESIGNATION | 212-555-1234 213-555-4567 |
| | CHARACTER STRINGS N | NO POSITION DATA | FUNCTION 1 |
| | BIT-MAPPED IMAGE 1 ⋮ | FIXED AREA DESIGNATION | FUNCTION 2 |
| | BIT-MAPPED IMAGE N | RELATIVE AREA DESIGNATION | 417-555-2323 |
| | BAR CODE 1 ⋮ | NO POSITION DATA | 201-555-6666 703-555-7777 |
| | BAR CODE N | FIXED AREA DESIGNATION | FUNCTION 2 |
| | COMBINATION OF TEXT AND GRAPHICS | PAGE DESIGNATION FOR TEXT FIXED AREA DESIGNATION FOR GRAPHICS | FUNCTION 3 |

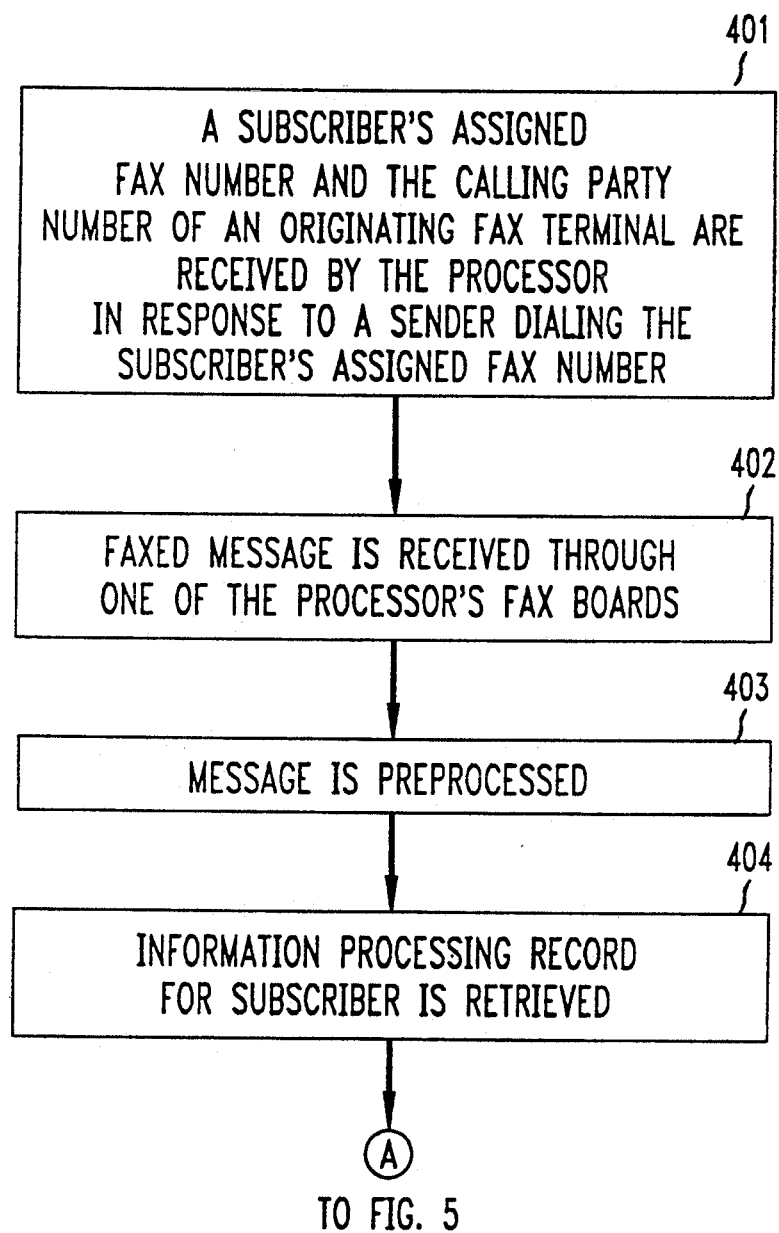

FACSIMILE MESSAGE PROCESSING AND ROUTING SYSTEM

TECHNICAL FIELD

This invention relates generally to facsimile communications systems and, in particular to a method and apparatus for routing and delivering facsimile messages to one or a plurality of destinations based jointly on the dialed number and the content of a portion of the messages themselves.

BACKGROUND OF THE INVENTION

The widespread deployment of facsimile terminals (including facsimile boards in processors) has constrained organizations, such as insurance companies that receive a large volume and a great variety of form-based facsimile messages processed at geographically dispersed locations, to choose between two unappealing solutions. To wit, these organizations must require their customers who transmit facsimile messages to them, to either know the correct destination for the message, or to send the message to a facsimile terminal at a central location where messages are sorted based on their content and redistributed to the correct destination. The first option forces a customer to remember the specific facsimile phone number associated with each specific type of form but offers the distinct advantage of immediate processing of the received information. The second option spares customers the inconvenience of dealing with multiple fax numbers, but introduces an undue delay in the processing of the received information caused by the sorting and rerouting tasks at the central site.

In an effort to improve the sorting and processing of facsimile-based messages, a system, disclosed in U.S. Pat. No. 4,566,127 issued on Jan. 21, 1986 to Kunibiko et al., presents a technique for combining the functions of a facsimile terminal and an optical character recognition unit in a processor to generate reports compiling and summarizing information received by one facsimile terminal from a plurality of facsimile senders. While the Kunibiko et al. technique improved the processing of facsimile messages for a specific group of facsimile users, it neither addressed the general delivery and processing needs of organizations with geographically dispersed processing centers, nor considered routing of facsimile messages based on the content of those messages.

SUMMARY OF THE INVENTION

In accordance with our invention, a processor connected to a communication switching system i) intercepts or receives each facsimile message destined for a subscriber of a service contemplated by this invention, ii) analyzes at least a portion of the content of each message to collect, in addition to the called number, other routing information from the transmitted message, and iii) reroutes the facsimile message to one or more appropriate destination facsimile terminals or devices based on a) the routing information gathered from the analyzed message content and b) pre-arranged routing information stored in the processor and provided by the subscriber.

In an exemplary embodiment of our invention, customers of a subscriber are provided with a dedicated facsimile telephone number for sending facsimile messages to that subscriber. In response to that dedicated facsimile number being dialed by a customer at an originating facsimile terminal, facsimile messages are transmitted to facsimile boards incorporated in a processor connected to a switch of the communication switching complex serving the customer and the subscriber. Associated with each dedicated facsimile number is an Information Processing Record (IPR) which contains message processing instructions for all facsimile calls destined for that subscriber. Of primary interest in the information processing record is a set of search records comprised of a search key field and a position data field. The search key field identifies specific character strings, bit-mapped images, bar codes or other content to be recognized or identified in a particular facsimile message. The position data field indicates a specific area in the facsimile message where the content of the search key field may be found in the facsimile message. The information processing record also contains a routing table which correlates at least one destination facsimile number at one (or more) subscriber's location(s) to a a search key field for each search record.

In the exemplary embodiment of our invention, the processor realigns at least a portion of the content of the facsimile message, i.e. the raw image facsimile file, to facilitate the examination and comparison of relevant parts of the received message to data in the search key field of all search records in the information processing record. Examination contemplated by this invention may include use of Optical Character Recognition (OCR) techniques, bar code reading processes or traditional keyword data comparison methods, depending on the content of the search key field. Upon finding a match, the processor accesses the routing table in the information processing record to look up the appropriate destination number(s) associated with the matched information and transmits the received facsimile message to this (these) number(s). Alternatively, the table lookup process may lead to the retrieval of a function code pointing to either a set of call processing instructions to be executed or logic programs to be run that may provide other value-added services such as language translation, text-to-speech conversion, etc. The additional call processing instructions are executed using as input a) routing parameters, such as calling party number, time of day, etc., and/or b) prestored subscriber specific parameters, such as sender's past dealing with the subscriber, for example, to derive facsimile destination numbers for the received message.

BRIEF DESCRIPTION OF THE DRAWINGS

In the drawing:

FIG. 3 represents an exemplary information processing record for a subscriber; and FIGS. 4 to 6 present, in flow diagram format, actions taken and decisions formulated by processor 105 of FIG. 1 leading to the routing and delivery of facsimile messages to appropriate destination facsimile terminal(s) or device(s).

DETAILED DESCRIPTION

Figure 1:
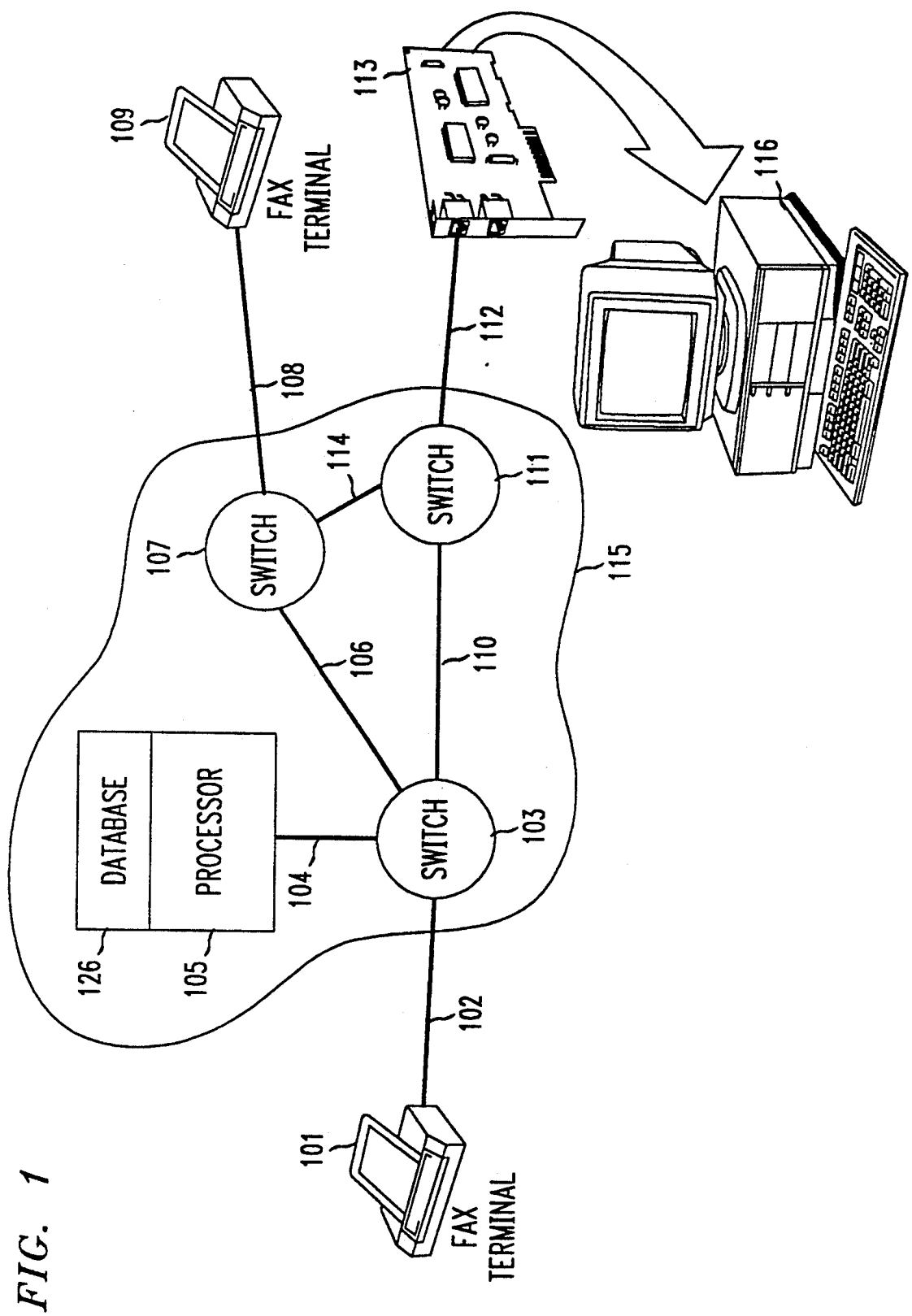
FIG. 1 shows, in simplified block diagram form, a communication switching complex that includes a processor arranged in accordance with our invention, to route facsimile messages to at least one of a plurality of destinations based upon information extracted from the message and information stored in the processor.

FIG. 1 shows, in block diagram form, a communication switching complex that includes a processor arranged in accordance with our invention to route facsimile messages to at least one of a plurality of destinations based upon information extracted from the message and information stored in the processor. In FIG. 1, originating facsimile terminal 101 is shown linked to switch 103 via line 102. Switch 103 is interconnected via intermachine trunks 106 and 110 to switches 107 and 111, respectively. Switches 103, 107 and 111 which can be either central office/toll switches, PBXs (or a combination of the foregoing) together form communication switching system 115 which may include other interconnected switches, signal transfer points, etc. not shown in FIG. 1. A central office switch may be, by way of example, an electronic program-controlled telecommunication switching system, such as the AT&T 5ESS ® switch. A detailed description of the structure of the AT&T 5ESS switch is provided in *AT&T Technical Journal*, Vol. 64, No. 6, part 2, pp. 1305-1564, July/August, 1985. As mentioned earlier, switches 103, 107 and 111 can also represent toll switches which are processor-controlled, software-driven long distance telephone switching systems that operate as point of access and egress for traffic from dependent central office switches (not represented in the drawing). If switch 103, 107 or 111 is a toll switch, it may be implemented using the AT&T 4ESS TM switch whose features and functionality are described in *Bell System Technical Journal (BSTJ)*, Vol. 56, No. 7, pp. 1015-1320, September 1977.

As mentioned earlier, switch 103, 107 or 111 may represent a PBX connected to the Public Switched Telephone Network. A PBX is a premises telecommunication switching system which interconnects voice, data and facsimile terminals at a customer's location and allows these terminals to communicate between themselves and with other non-premises compatible terminals via its connection to the public switched telephone network. A PBX may be implemented using the AT&T Definity ® whose salient features are described in an article published in *AT&T Technology* Vol. 4, No. 2, pp 50-59, September 1989

In FIG. 1, destination facsimile terminals are represented by fax terminal 109 and plug-in fax board 113 inserted in processor 116. A fax board can be implemented using the AT&T Fax Connection (FAX CON-20) hardware supplemented by the AT&T software Fax Manager running on a host, such as processor 116. A detailed description of FAX CON-20 hardware and the Fax manager software can be found in an article published in *AT&T Technology* Vol. 4, No 2, pp 12-17, September 1989.

Connected via data line 104 to switch 103 is processor 105 arranged in accordance with our invention to route facsimile messages based on information retrieved from the message and information stored in the processor. Processor 105 includes database 126 arranged to store information in the form of an Information Processing Record (described more fully below). Database 126 also contains the instructions to process facsimile calls directed to subscribers.

The main functions of processor 105 can be grouped under four general headings, namely a) retrieval of the information processing record from database 126 using the number dialed by the customer/sender as a key; b) examination of facsimile message content to match data in a search key pointed by the information processing record; c) retrieving function numbers, if appropriate, associated with data in search key field located in the received message and executing additional processing instructions or programs; and d) retrieving destination numbers associated with the matched searched key(s) and delivering the facsimile message to facsimile terminals at those numbers. Before proceeding to a detailed description of the features and functionality of processor 105, it should be recognized that processor 105 and associated database 126 are shown as part of communication switching system 115 indicating that it is preferable to have the system contemplated by this invention, shared by a great number of users in order to take advantage of economies of scale and other benefits created by a critical mass of users. However, this disclosure does not limit the scope of implementation of our invention to network-based applications. Implementations involving premises-based systems are also feasible.

A. Retrieval of Information Processing Record Based on the Dialed Number

· According to our invention, each subscriber is assigned at least one dedicated number that is given to customers and others likely to send faxes to the subscriber. Communication switching system 115 associates the subscriber's assigned number to a specific processor, say processor 105. Thus, facsimile messages destined for a subscriber are routed by communication switching system 115 to processor 105. Although not represented in the drawing, several processors can be implemented, whereby a single processor is connected to each switch in communication switching system 115. Alternatively, one or more processors can be linked to some or all of the switches in communication switching system 115 via a common channel signaling network (such as a CCS7 network).

Upon receiving a facsimile message for a specific subscriber, processor 105 uses the number dialed by the sender/customer as a key to retrieve from database 126 the information processing record for that subscriber. Included in the information processing record (described in more detail below) is a set of search records which may consist of specific recognizable patterns, such as specific keywords, bar codes, bit map images or handwritten information to be spotted and examined in the content of the facsimile message.

B. Examination of Message Content

Since the information received by processor 105 from an originating facsimile terminal (such as facsimile terminal 101) may have a variety of font size and text size, and/or may have been subject to noise caused by interference in the transmission facilities, processor 105 advantageously may be arranged to prepare received information for the recognition and identification process by performing certain preprocessing functions. These functions may include correcting any rotational error or shear distortion in the received fax message file using skew and shear correction techniques, such as the one described in U.S. Pat. No. 5,001,766 issued May 16, 1988 to H. S. Baird. The faxed image file may be further corrected for distortion at predesignated areas, if necessary, using techniques similar to the iterative process described in U.S. Pat. No. 5,020,123 issued May 28, 1991 to T. Thompson.

Once the message (or a portion thereof) has been realigned and/or corrected, a selected portion of the message is then processed to locate and identify in the message the content of the search key field. For example, the portion of the message processed could be one page of the message as it would look, if displayed. It is to be understood however, that the faxed message or the portion thereof to be processed does not have to be displayed or physically printed for the processing described below to be operative.

Message examination and processing includes primarily text and graphics comparison and recognition. For example, a keyword or a set of character strings in the search key field may be compared to all words in the message using prior art data comparison techniques after the message or relevant portion thereof has been converted from a bit-mapped image format to an ASCII file format. The bit-mapped image to ASCII format conversion is needed because a facsimile message encodes a document as an image represented by a series of picture elements or pixels that define the images in the fax. These images need to be re-encoded as alphanumeric characters or symbols to allow comparisons with other alphanumeric characters or symbols. Similarly, if the search key field contains a bar code, patterns of bar codes are first located in the message and subsequently compared to the pattern in the search key field. When a sequence of thick and thin lines (in a certain order) in the message resembles within a definite degree of certainty the pattern represented by the bar code in the search key field, a match is considered to be found. In addition, a properly aligned and corrected message may be scanned to locate a bit-mapped image contained in a search key field. A bit-mapped image ordinarily comprises a specific design or shape consisting of a multitude of bit patterns called picture elements or pixels arranged in a specific fashion to form an image. Locating and comparing bit-mapped images in a search key field to the content of a message can be done, for example, using comparison techniques as described by Baird et al. in *Proceedings of the Tenth International Conference on Pattern Recognition*, p 820, June 1990, IEEE Computer Society Press. Other more mature techniques using template matching algorithms and feature extraction methodology can also be used for bit-mapped image comparison processes. A detailed description of these techniques can be found in *AT&T Technology*, Volume 6, No 4, 1991. As mentioned earlier, a search record also contains a position data field. The latter which is described in further detail below, provides points of reference for the search, thereby limiting the scope of the area in the message to be searched. For instance, a pre-printed medical insurance form may have as points of reference predesignated areas for the name and address of the doctor, the social security number of the patient, the logo of the institution paying for the medical group coverage, etc. The examination and scanning process of a fax message of this type of form may concentrate on the printed, typed or handwritten information contained in those predesignated areas. Alternatively, simpler applications may consist of examining the content of option boxes in received fax forms to determine the presence of patterns such as check marks, X-shaped figures or other symbols indicative of the selection of a specific option associated with the box.

C. Execution of Additional Processing Instructions or Programs

Once the content of a search key field (character strings, bar codes, bit-mapped images) have been located and identified in a message, processor 105 uses a table lookup technique to determine the appropriate destination for the message. This is done, for example, by matching the search record to one or more specific destination numbers, and/or a specific function code in a routing table. If the routing table points to a destination number, processor 105 skips to the retrieval of destination numbers step described below. When a function code is retrieved, processor 105 executes pre-stored call processing instructions to derive the destination number(s) of facsimile terminal(s) or device(s) to which processor 105 delivers the message. These call processing instructions may use as input routing parameters, such as the time of day or the day of the week that a fax message is received by processor 105. These call processing instructions may also use as input subscriber specific data, such as dollar value threshold for a transaction, past dealings with a customer, etc. For example, facsimile messages of medical claims exceeding a certain dollar value may be directed to the destination facsimile terminal of the auditing department, while smaller claims are forwarded to appropriate claim processing departments.

D. Retrieval of Destination Numbers

Once the destination number(s) is (are) identified either by matching the search key field to destination number in the information processing record, or through execution of processing instructions described above, processor 105 retrieves the destination number(s) and delivers the message in the format indicated by the programs to the appropriate destination(s). Additional processing, such as text-to-speech conversion, or language translation may take place in processor 105 to deliver the message in the appropriate format.

Figure 2:
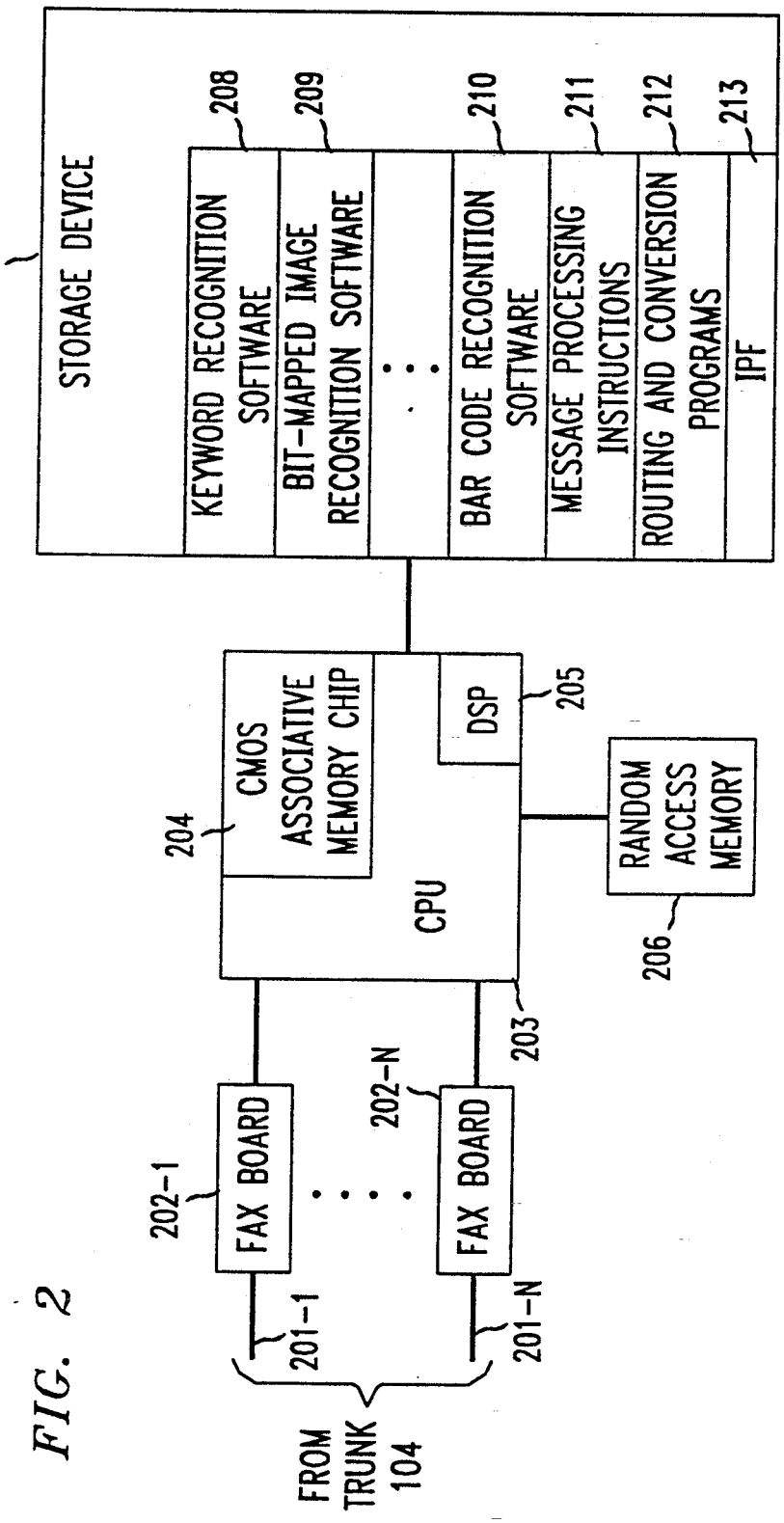
FIG. 2 illustrates an exemplary arrangement for processor 105 of FIG. 1, which executes facsimile call routing instructions stored therein.

Shown in FIG. 2 is a block diagram of the major components of processor 105. The processor can include a personal computer, such as the AT&T 6386 Work Group System (WGS) or a minicomputer, such as the AT&T System 7000 running recognition software (described below) and a database management system software, such as Informix ® SQL or Oracle ® 4GL. The database management system software in question is described above, and is represented in FIG. 1 by database 126. Processor 105 includes CPU 203 which executes message processing instructions and performs the operations indicated by the stored software programs. Processor 105 has a digital multiplexed interface connected to trunk 104 through which, facsimile messages are received and directed via logical channels 201-1 to 201-N to corresponding facsimile boards 202-1 to 202-N. Facsimile boards 202-1 to 202-N are also used to transmit messages to destination facsimile terminals or devices. One element of CPU 203 is Digital Signal Processor (DSP) 205, which is a general purpose co-processor used to speed up complex mathematical computations such as classification, comparison and recognition operations. DSP 205 may be implemented using the AT&T DSP-32C. In addition to DSP 205, CPU 203 also includes CMOS associative memory chip 204, which is a specialized type of chip whose architecture and functionality are described in *Proceedings of the IEEE First International Conference on Neural Networks*, pages III-461, IEEE, 1987, San Diego Calif. Chip 204 can store many templates (up to 49) which can contain many bit patterns representing, for example a bit-mapped image or a bar code. Chip 204 allows binary input vectors up to 49 bits long to be loaded on the chip and compared in parallel to each of the 49 templates storing the bit-mapped images or the bar codes.

Connected to CPU 203 is random access memory 204 which receives from CPU 203 instructions from pre-stored software to be loaded in memory 204 for faster execution. Also attached to CPU 203 is storage device 207 which may consist of a high capacity, short access time storage medium, such as one or more erasable optical disk drives to satisfy the performance requirements of our invention. One of the disk drives may store the search records in a non-alterable, non-erasable medium, such as a Write-Once-Read-Many (WORM) medium to prevent accidental modification of any stored data, such as a digital representation of a bit-mapped image in a search key field. Contained in storage device 207 is information processing file (IPF) 213 which stores the information processing record (IPR) for each subscriber. An exemplary illustration of an IPR is provided in FIG. 3 and discussed in further detail below. Storage device 207 also contains keyword recognition software 208, bit-mapped image recognition software 209 and bar code recognition software 210. Keyword recognition software 208 is a set of programs that use data comparison techniques to match a keyword or a string of characters in the search key field to all the words in at least a portion of a received facsimile message after the latter has been converted from a bit-mapped image digital representation to an ASCII file. By contrast, bit-mapped recognition software 209 and bar code recognition software 210 take advantage of optical image recognition techniques using mathematical algorithms to implement neural network designs. As mentioned earlier, the techniques described in the Baird et. al. article may also be used to implement bit-mapped image recognition software 209.

FIG. 3 is an exemplary representation of an Information Processing Record for a subscriber. The IPR is comprised of three main elements, namely, a) the dialed number, b) the search record and c) the destination/-function number.

A. Dialed Number

The dialed number is the fax number assigned to a subscriber which is used as key by processor 105 to retrieve the IPR for that particular subscriber. In FIG. 3, the subscriber has an assigned facsimile number, for example 800-222-8888, to which is associated a set of search records. Although an 800 number is listed in FIG. 3 for illustrative purposes, persons skilled in the art would understand that any telephone number can be used as a means of access to processor 105. If an 800 number is used, it is translated for routing purposes into a routing number by a processor in communication switching system 115 called a Network Control Point (NCP) (not represented in the drawing). Thus, the routing number, as opposed to the 800 number, is used as key to retrieve the IPR for the subscriber. The operation of an NCP is described, for example, in the D. Sheinbein, et al., article on pp. 1737-1744 of *Bell System Technical Journal* (BSTJ), September, 1982, Volume 61, No. 7, Part 3.

B. Search Record.

A search record indicates i) what type of information the recognition software has to look for in the facsimile message and ii) where in the message that information may be located. More specifically, a search record represents a predetermined set of graphical or text information which may include position data indicative of the general area or page in a facsimile document where such graphical or text information may be located. As shown in FIG. 3, the search record is comprised of two fields, namely the search key field and the position data field. The search key field can be considered as a template or a gauge to which at least a portion of a facsimile message content can be compared. Information contained in a search key field can include graphics and text data. Types of graphical information can include bar codes and bit-mapped images which may represent a company's logo, handwritten information, and other patterns such as Kanji or Chinese characters. Simpler representation of graphical information may include X-shaped pattern, check marks or blackened area in a check-off box. Conversely, text information includes alphanumeric character strings and keywords. The position data, when available, provides directions as to where in the received facsimile document, the text or graphics data contained in the search key field is likely to be found, and therefore allows the recognition software to target its comparison operations in the received message to the general area or specific location indicated by the position data. In the position-data field, a page designation indicates a specific page in the received fax document, while a fixed area designation refers to a specific location on a page. For example, a fixed area designation may be formulated as a three inch by three inch square area at the upper right hand corner of page 2. By contrast, a relative area designation refers to a location on any page that is within a predetermined distance of either a specific ASCII character, such as the dollar sign, or character strings "Social Security Number".

C. Destination/Function Number

Correlated to each search record is a set of destination/function number(s). For example, the search characterized by character-string-1 and position data "page designation" is associated with two fictitious destination telephone numbers 212-555-1234 and 213-555-4567, respectively. Thus, a received facsimile message in which character-string-1 has been located and identified, will be routed to facsimile terminals or devices at both of those numbers. Similarly, the search record identified by character-string-N and position data "no position data" is associated with Function 1. When a function number is retrieved from the table lookup process, a set of call message processing instructions are executed or Value Added Services (VAS) programs (described below) are run to derive appropriate destination numbers for the received message.

Referring to FIG. 4, the process contemplated by our invention, and performed by processor 105, is initiated in step 401, when processor 105 receives signaling information from communication switching system 115 including the assigned fax number of a subscriber and the calling party number of an originating fax terminal. This information is received in processor 105 via line 102 when a sender of a facsimile message dials the subscriber's assigned fax number at an originating facsimile terminal, such as terminal 101. Since processor 105 can receive fax messages through a plurality of fax boards, the fax message, transmitted by the sender, is received by processor 105, in step 402, through one of its available fax boards. The connection between the caller and processor 105 is established via one of the logical channels of trunk 104. If no fax board in processor 105 is available, a busy tone is returned to the originating facsimile terminal by communication switching system 115. The fax board selected to receive the message returns a high pitch tone to the sender to indicate that the facsimile transmittal process can begin. Conventional transmission methods, which are not part of this invention, are used to send the complete facsimile message to the selected fax board of processor 105. The received message is kept in storage device 207 in a form that allows the content or specific portions thereof to be accessed, preprocessed and/or examined.

Upon receiving the complete facsimile message, processor 105, in step 403, preprocesses the received message by correcting it a) for skew and shear deformation and b) noise distortion using techniques consistent with the teachings of Baird and Thompson cited above. Such correction of skew and shear deformation facilitates the recognition and comparison tasks described below. Following the preprocessing of the received message, processor 105, in step 404, uses the dialed number as a key to retrieve from information processing file (IPF) 213, the Information Processing Record for the subscriber. Data retrieval is effected by comparing a known data element (such as the dialed number received by processor 105) to a predesignated field in the record called a key field. Upon finding a match, all the segments of database 126 are accessed by relevant application programs running on processor 105.

Figure 5:
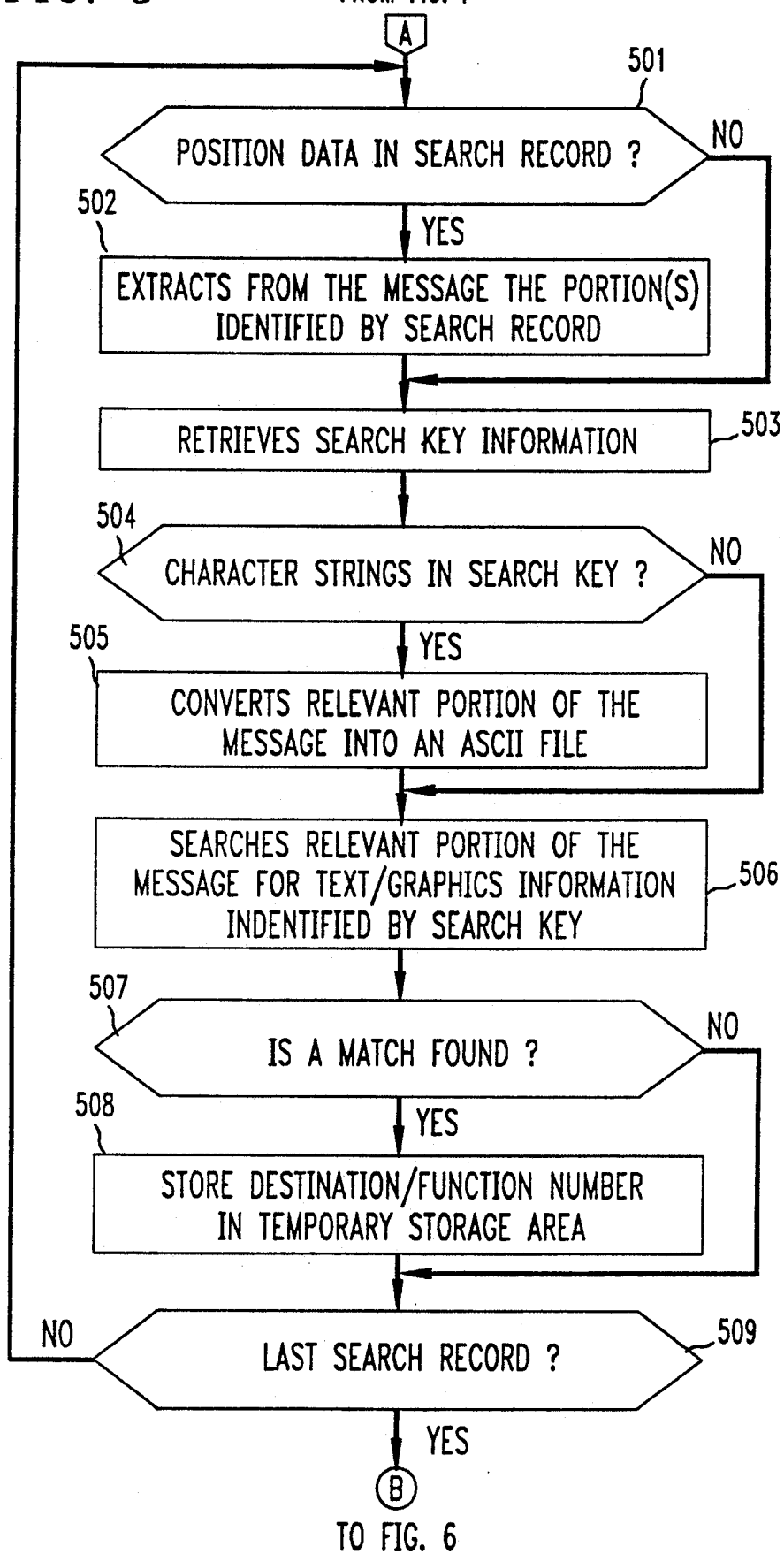

Referring to FIG. 5, processor 105, in step 501, retrieves sequentially a search record in the Information Processing Record, which was identified in the process of FIG. 4, and checks the content of the position data field to determine whether the examination of the received and stored facsimile message should be limited to a portion of the message. If the position data field indicates a page designation or an area designation (fixed or relative), processor 105, in step 502, extracts from the stored message the portion(s) identified by the position data. For the search record in question, only the extracted portion of the message is considered for comparison and recognition analysis described below. Conversely, if no position data is available for the retrieved search record, the whole message is considered in subsequent steps. Processor 105, in step 503, then examines the search key in the retrieved search record to determine whether it contains a set of character strings or as explained later, a set of bar codes, bit-mapped images or any combination of the latter. If the search key contains a string of characters, processor 105 converts relevant portions of the message into an ASCII file, in step 504. For example, if the position data in the search record indicates that only the first page should be compared to the content of the search key, then only the first page of the message is converted to an ASCII file. If no position data is available for the search record, then only portions of the message that can be transformed to an ASCII file are converted. Bit-mapped images in a message that cannot be converted into an ASCII file are ignored by the software that performs the conversion. In step 506, processor 105 searches relevant portions of the message to compare the graphics/text information identified by the search key to locate that information. As mentioned earlier, the text information in the search key includes primarily characters strings representing any combination of alphanumeric characters and other symbols (such as dollar sign, pound sign) that can be represented in an ASCII file. Graphics information by contrast, are comprised of specific arrangements of picture elements that define a bit-mapped image that may be a set of bar codes or any representative symbols such as companies' logos, non-latin alphabet characters etc. The comparison techniques for graphics information described in the above cited Baird article may be implemented in bit-mapped image recognition software 209 to recognize the content of the search key field in the message. Similarly, bar code recognition software 210 described above, is used to identify bar codes in a search key field. Conversely, if the search key field contains a set of character strings, keyword recognition software 208 is used to locate the data in the search key field in relevant portions of the message. In step 507, processor 105 determines whether the graphics/text information in the search key was located in the message. If a match is found, processor 105 uses conventional table look-up technique, in step 508, to retrieve the destination/function number associated with the search record. The retrieved destination/function number is stored in a temporary area of storage device 207. In step 509, processor 105 determines whether there is any additional search record in the Information Processing Record. If an additional search record is found, processor 105 repeats steps 501 to 509. If no search record is left, then processor 105 checks the content of the temporary storage area to determine whether a) it contains one or more destination/function numbers derived from the searching and comparison operation or b) it is empty, indicating that no matches were found in the searching and comparison operations of step 506. If no data is contained in the temporary storage area, processor 105, in step 511, through one of its fax boards transmits the entire stored message to a prearranged default destination. The latter could be the subscriber's main mail room where fax messages are manually sorted. If the temporary storage area contains one or more destination/function number(s), processor 105 performs the steps illustrated in FIG. 6 described below.

Figure 6:
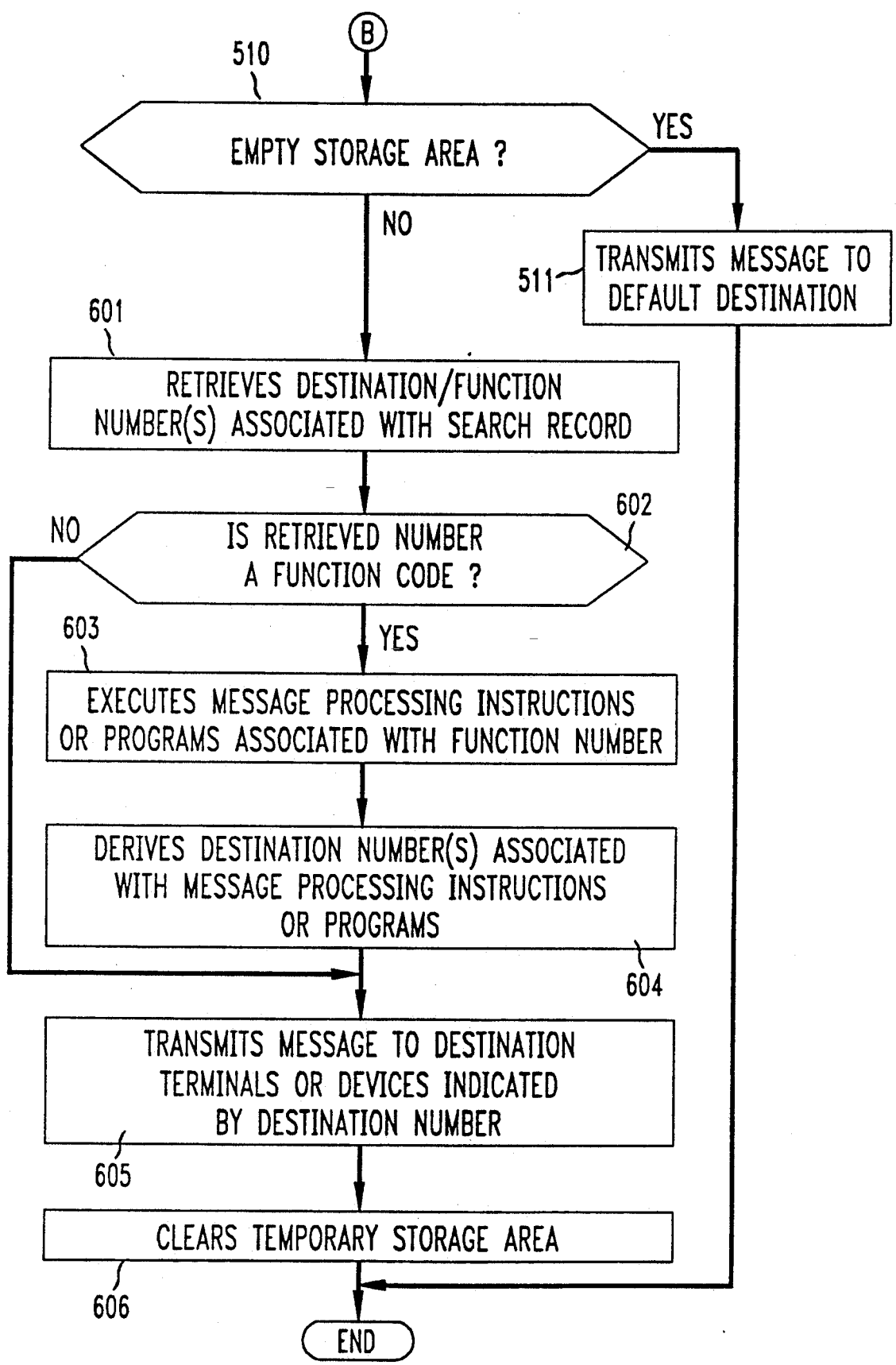

Referring to FIG. 6, upon determining that the temporary storage area is not empty, processor 105, in step 601, retrieves the destination/function numbers in the temporary storage area. In step 602, processor 105 checks each number retrieved to determine whether it is a destination or a function number. This can be implemented, for example by representing a function number with a two-digit code, while a destination number is represented by a seven or ten digit code. Thus a quick scan of the length of the field allows processor 105 to decide whether the temporary storage area contains a function or a destination number. If a retrieved number is a function code, processor 105 executes message processing instructions 211 or runs Value-Added Services (VAS) software stored in routing and conversion programs 212, associated with the retrieved number. As mentioned earlier, message processing instructions 211 and routing and conversion software 212 can usa a) information retrieved from the facsimile message, b) call routing parameters and c) prestored subscriber-specific information to derive destination number(s) for the message in step 604. Call routing parameters parameters may include source-related information associated with the call, such as the telephone number of the originating facsimile terminal, the time at which the facsimile call is originated, the geographic location of the originating facsimile terminal, the time zone in which the facsimile terminal is located, etc. Subscriber-specific information by contrast, may comprise a) source information associated with the sender, such as financial data, threshold value for transactions, and b) requirements data for a particular subscriber, such as message delivery format for a specific destination, etc.

In step 605, processor 105 uses one of its available fax boards to transmit the message to facsimile terminals or devices indicated by the destination number(s). If the subscriber-specific information mentioned above, indicates that the message for a derived destination has to be delivered in a different format than the facsimile format in which it was received and stored, then processor 105 runs the VAS programs to effectuate the format conversion. For example, facsimile messages written in a foreign language may be translated literally in the native language of the receiving party prior to delivery. Similarly, a facsimile message, after an initial conversion to an ASCII file may be the object of a further conversion (from text-to-speech) to facilitate its delivery in speech format to a voice mail destination. As a practical matter, once a received facsimile message has been converted to an ASCII file, the array of transformations or conversions to which the message can be subjected, is limited only by the type of VAS programs running on processor 105.

In step 606, processor 105 clears the temporary storage area to allow that area to be used for subsequent facsimile message processing.

The above description is to be construed as only an illustrative embodiment of this invention. Persons skilled in the art can easily conceive of alternative arrangements providing functionality similar to our invention without any deviation from the fundamental principles or the scope of this invention.

Advantageously, our invention provides distinct benefits to all parties involved in the transaction. For subscribers, our invention allows implementation of "just-in-time" message processing by eliminating the need for clerical personnel at a central site to analyze the content of a message to determine its ultimate destinations and to retransmit the received message to those destinations for final disposition. Subscribers can also benefit from value added services, such as text-to-speech conversion and message translation. Conversely, for message senders, the simple transmission procedure afforded by this invention relieves them of the burden of ascertaining for a fax message the correct destination(s) within an organization, based on the content of that message or the nature of the transaction. Similarly, for communications carriers, this invention eliminates unneeded retransmission and allows their communication switching system to make intelligent processing and routing decisions that could not otherwise be supported.

I claim:

1. A method of routing a facsimile message through a communication switching complex, wherein said method comprises the steps of:
   receiving said facsimile message in a processor included in said communication switching complex;
   accessing a database to retrieve a profile indicating the location and type of information to be recognized in said message;
   recognizing in said message information which is similar to said information indicated in said profile;
   deriving for said message at least one destination address through at least one table lookup operation using said profile; and
   routing said message to said at least one destination address.

2. The method of claim 1, wherein said message is received as a result of a sender dialing a particular number associated with said processor and wherein said database accessing step includes the step of executing programs which use as input a) source information associated with said facsimile message, and b) said dialed number.

3. The method of claim, 1 wherein said routing step further includes the step of converting the format of said received facsimile message.

4. The method of claim 3, wherein said converting step includes the step of translating said facsimile message from text to speech.

5. The method of claim 3, wherein said converting step includes the step of translating said facsimile message from one language to another language.

6. The method of claim 1 wherein said recognizing step includes the step of matching at least one template of a bit-mapped image in said profile to a bit-mapped image in said message.

7. The method of claim 1 wherein said recognizing step further includes the step of matching at least one string of characters in said profile to at least one string of characters in said message.

8. In a communication switching complex which includes a plurality of switches, and at least one processor which is connected to one of said switches and which stores a plurality of subscriber's profiles, each of said subscriber's profiles including information a) correlating destination address data to bit-mapped images and keywords, and b) indicating the location and type of information to be recognized in a facsimile message received for one of said subscribers, a method of processing and routing a facsimile message comprising the steps of:
   retrieving in said processor a particular profile associated with a particular one of said subscribers based on a number dialed by a sender;
   comparing at least a portion of said content of said facsimile message to a part of said information in said particular profile to derive from said profile destination information for at least one destination device; and
   routing said facsimile message to said at least one destination device.

9. The method of claim 8, wherein said method further includes the step of
   routing said facsimile message to at least one default destination when no match is found between said part of said information in said particular profile and said content of said facsimile message.

10. A method of i) processing a facsimile call based on the content of the facsimile message associated with said call and ii) delivering said facsimile message from a sender to at least one of a plurality of destination facsimile terminals connected to a communication switching system, said system including a) a plurality of switches and b) a processor which is linked to one of said switches and which stores i) a database containing subscriber-defined processing instructions, ii) routing tables, and iii) search records containing search keys and position data identifying specific recognizable patterns to be located in defined areas in said message, wherein said method comprises the steps of:
   (a) querying said database using said dialed number as a key, to retrieve said processing instructions and said search record from said database;
   (b) executing said processing instructions to examine at least a portion of the content of said message to locate said recognizable patterns in said message;

(c) responsive to said locating of said recognizable patterns in said message, translating the identity of said search record to the telephone number(s) of at least one of associated destination facsimile terminals using said routing table for said translating; and (d) transmitting said message to at least one of said destination facsimile terminals.

11. The method of claim 10, wherein said method further includes the steps of:

ascertaining the busy-idle state of a destination facsimile terminal; and storing said message for later delivery to said destination facsimile terminal in response to a busy line condition at one of said destination facsimile terminals.

12. The method of claim 11, wherein said method includes the step of delivering said received message to a default destination facsimile terminal in response to said busy line condition.

13. The method of claim 10, wherein said executing step further includes the steps of:

preprocessing said message by aligning said message to correct rotational error and shear distortion;

scanning said preprocessed message to extract said portion of said message identified by said position data in said search record; and comparing information in said portion of said message to said patterns in said search key of said search record.

14. A system of routing through a communication switching complex a facsimile message transmitted by a sender, said system comprising:

a processor and an associated database;

means for receiving said facsimile message in said processor;

means for retrieving from said database a stored profile indicating the type and location of information to be recognized in said facsimile message;

means for recognizing said information in said facsimile message content;

means for deriving from said profile destination information associated with said information recognized in said facsimile message; and means for routing said message to at least one destination device indicated by said destination information.

15. The system of claim 14, wherein said means for retrieving said stored profile from said database includes means for executing programs which use as input a) source information associated with said facsimile message and b) a number dialed by said sender to transmit said facsimile message.

16. The system of claim 14, wherein said routing means includes means for converting the format of said facsimile message.

17. The system of claim 16, wherein said converting means includes means for translating said facsimile message from text to speech.

18. The system of claim 16, wherein said converting means further includes means for translating said facsimile message from one language to another language.

19. A system for processing and routing facsimile messages transmitted to a subscriber by a sender's originating facsimile terminal connected to a communication switching complex, said system comprising:

a plurality of interconnected switches forming said communications switching complex;

at least one processor connected to one of said switches and arranged to store in its storage devices a plurality of subscriber's profiles, each of said profiles including information a) correlating destination address data to bit-mapped images and keywords, and b) indicating the location and type of information to be recognized in a facsimile message;

means for retrieving in said processor a particular profile associated with said subscriber based on the number dialed by said sender;

means for comparing at least a portion of the content of said facsimile message located and identified by said information in said profile to identify particular destination address data for said facsimile message and means for routing said facsimile message to at least one facsimile device identified by said destination information based upon the output of said comparing means.

20. The system of claim 19 further including means for routing said message to a default destination when no match is found between said part of said information in said particular profiles and said content of said facsimile message.

21. The system of claim 19, wherein said comparing means includes means for selecting said portion of said facsimile message content in response to information in said particular profile.

22. A system of processing a sender's facsimile call and delivering the facsimile message associated with said call to at least one of a plurality of destination facsimile terminals connected to a communication switching complex which includes a processor and a database, wherein said system comprises:

means for receiving said facsimile message in said processor;

means for querying said database using the number dialed by said sender as a key, to retrieve processing instructions from said database;

means for executing said processing instructions to select a portion of the content of said message to be examined;

means for locating and recognizing predetermined patterns in at least a portion of said message as a function of said examination;

means for deriving destination addresses associated with said patterns located in said message; and means for transmitting said message to destination facsimile terminals at said destination addresses.

23. The system of claim 22, wherein said system further includes:

means for ascertaining the busy-idle state of a destination facsimile terminal; and means for storing said message for later delivery in response to a busy line condition at said destination facsimile terminal.

24. The system of claim 23 further including means for delivering said received message to a default facsimile terminal in response to said busy line condition.

25. The system of claim 22, wherein said executing means includes:

means for preprocessing said message by aligning said message to correct rotational error and shear distortion;

means for extracting relevant portion of said message identified by stored information in said database; and means for comparing information in said portion of said message to said predetermined patterns.

* * * * *